No. 707,057. Patented Aug. 12, 1902.
T. T. GAFF & J. F. GENT.
APPARATUS FOR THE DEGERMINATION AND DECORTICATION OF INDIAN CORN.
(Application filed Oct. 28, 1901.)
(No Model.) 4 Sheets—Sheet 1.
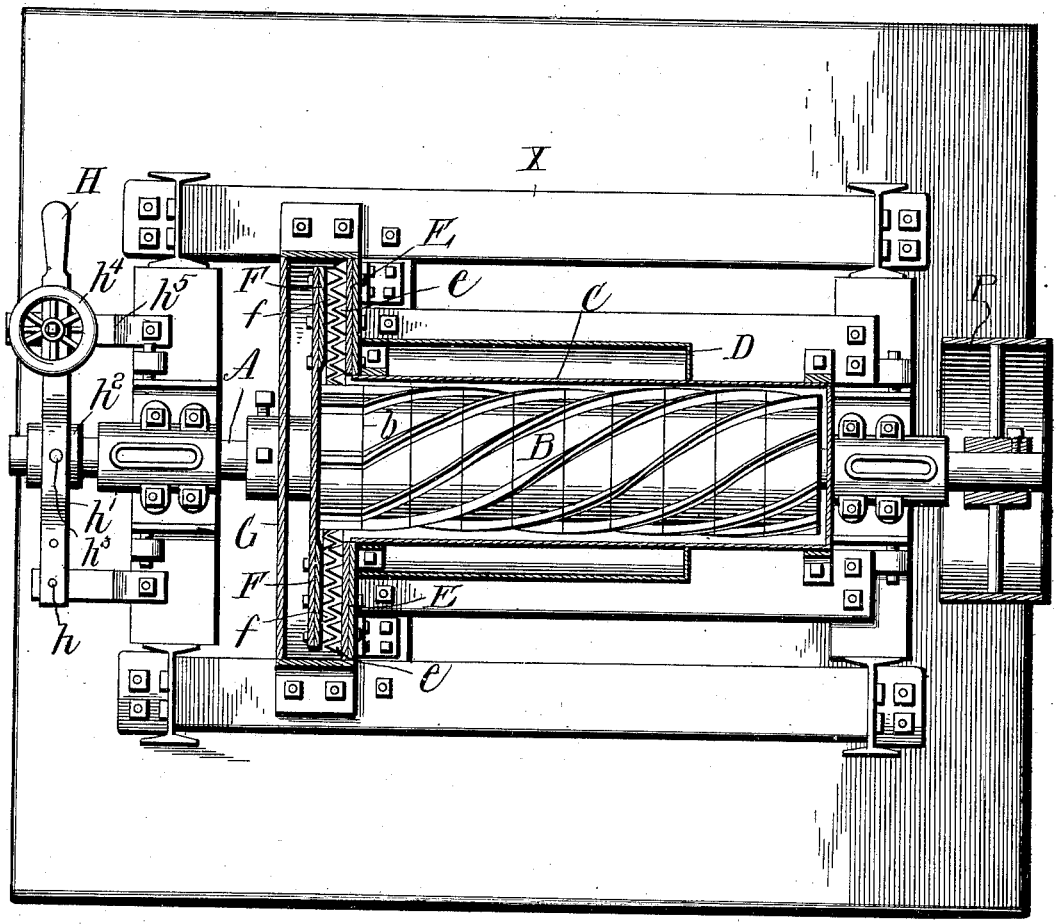

No. 707,057. Patented Aug. 12, 1902.
T. T. GAFF & J. F. GENT.
APPARATUS FOR THE DEGERMINATION AND DECORTICATION OF INDIAN CORN.
(Application filed Oct. 28, 1901.)
(No Model.) 4 Sheets—Sheet 2.
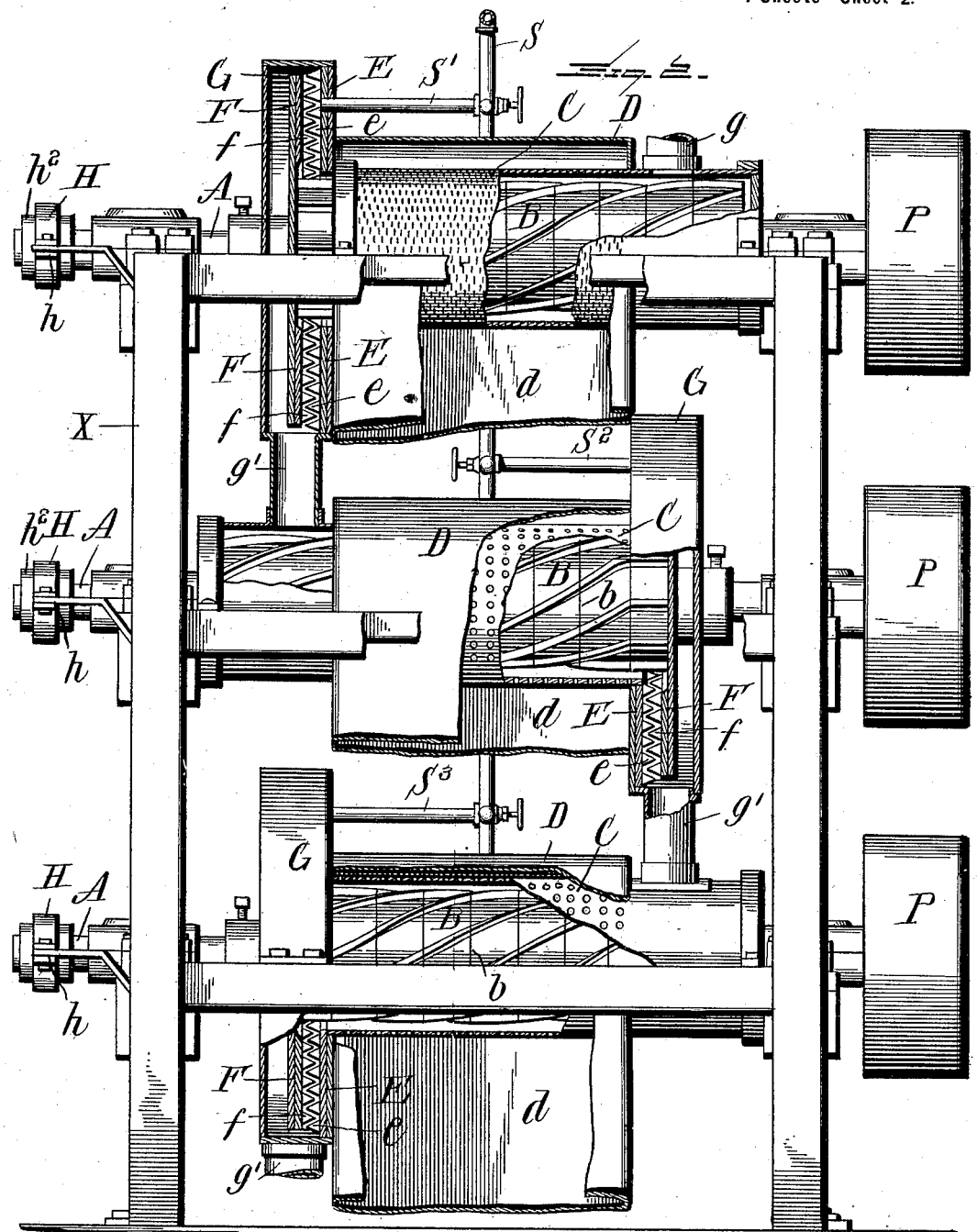

No. 707,057. Patented Aug. 12, 1902.
T. T. GAFF & J. F. GENT.
APPARATUS FOR THE DEGERMINATION AND DECORTICATION OF INDIAN CORN.
(Application filed Oct. 28, 1901.)
(No Model.) 4 Sheets—Sheet 3.
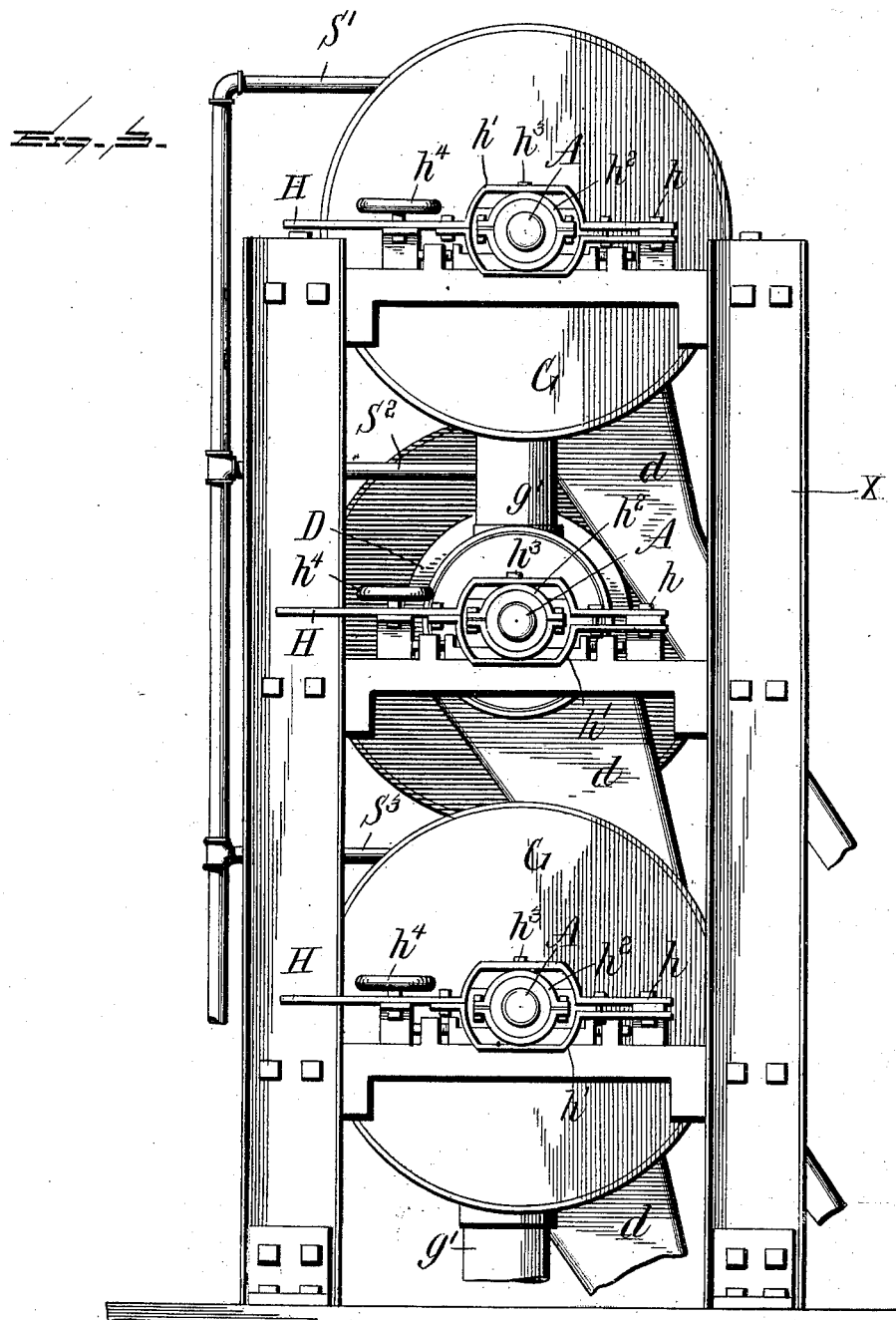

No. 707,057. Patented Aug. 12, 1902.
T. T. GAFF & J. F. GENT.
APPARATUS FOR THE DEGERMINATION AND DECORTICATION OF INDIAN CORN.
(Application filed Oct. 28, 1901.)
(No Model.) 4 Sheets—Sheet 4.
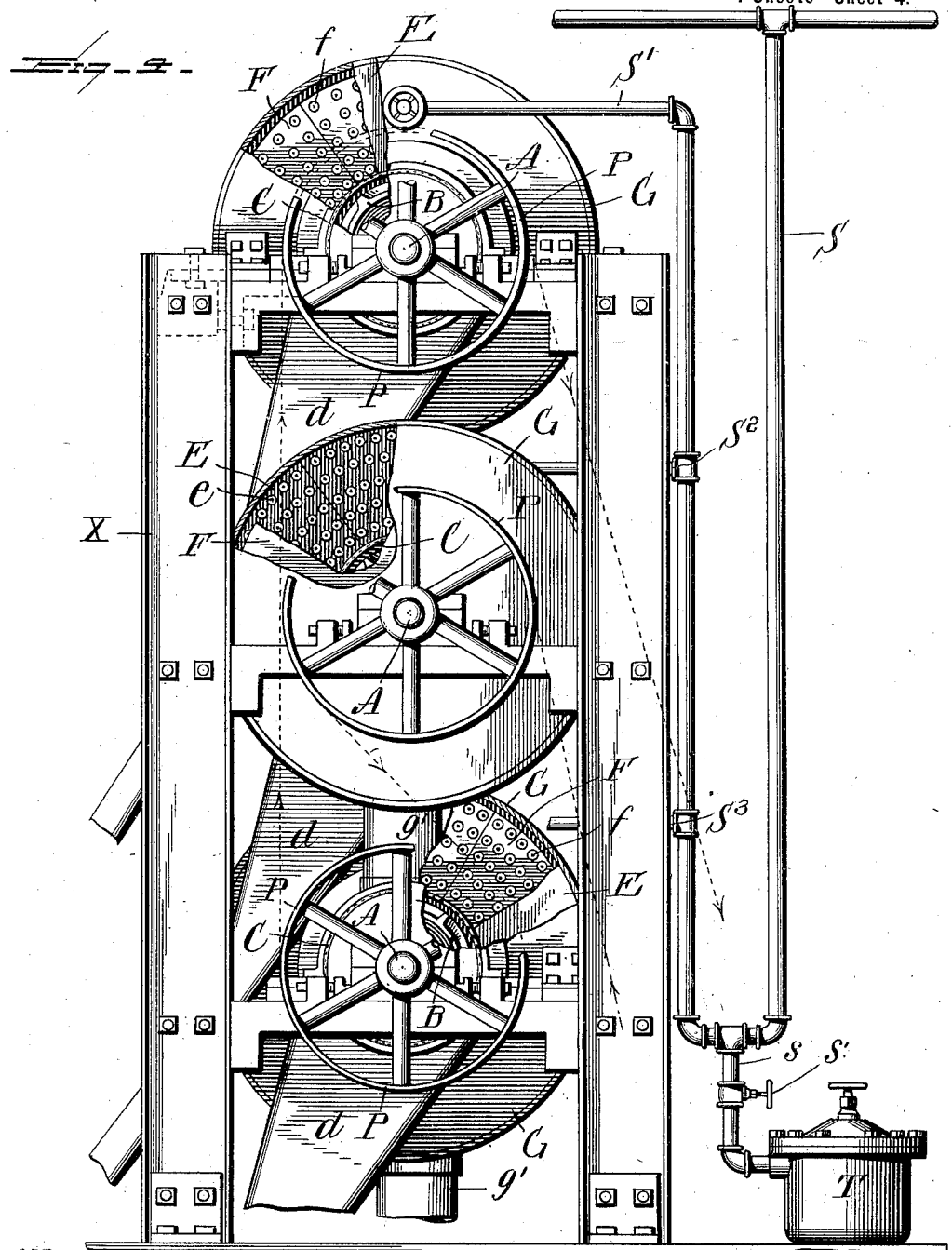

UNITED STATES PATENT OFFICE.

THOMAS T. GAFF, OF BARNSTABLE, MASSACHUSETTS, AND JOSEPH F. GENT, OF INDIANAPOLIS, INDIANA; SAID GENT ASSIGNOR OF ONE-THIRD OF HIS RIGHT TO SAID GAFF.

APPARATUS FOR THE DEGERMINATION AND DECORTICATION OF INDIAN CORN.

SPECIFICATION forming part of Letters Patent No. 707,057, dated August 12, 1902.

Application filed October 28, 1901. Serial No. 80,253. (No model.)

*To all whom it may concern:*

Be it known that we, THOMAS T. GAFF, of Barnstable, in the county of Barnstable and State of Massachusetts, and JOSEPH F. GENT, of Indianapolis, in the county of Marion and State of Indiana, have invented a certain new and useful Improvement in Apparatus for the Degermination and Decortication of Maize or Indian Corn, of which the following is a specification.

In the milling of maize as ordinarily practiced the initial step is the subjection of the grain to a preliminary breaking and so-called "degermination," the object of which is to destroy the adhesion of the hulls or skins and of the germs to the other portions of the grain. To accomplish this, it has been customary to introduce the grain, usually after a preliminary moistening, into a breaking-machine, the "degerminator," where it is subjected to a process of breaking or cracking, which is continued until the whole charge has been reduced to the desired extent, in so far, at least, as the imperfections or limitations of the machine employed will permit. Occasional kernels may escape unchanged or insufficiently broken; but this is due not to design, but to accident or to the inherent defects of the machine itself. The result of this mode of treatment is that an undue amount of the valuable starchy portion of the grain is comminuted into meal and passes over eventually into the less valuable offal or feed. This unprofitable overproduction of meal is due partly to the fact that no moisture is supplied to the grain during the process of reduction, but chiefly to the fact that inasmuch as the whole charge is retained in the machine until the entire contents have, as far as practicable, been reduced to the desired extent, and inasmuch as some of the kernels will during this process of reduction be brought to the condition of "finished" material before the others, the retention of this finished product in the machine and its continued exposure therein to the action of the breaker results in reducing it in a greater or less degree into meal by the time the more slowly acted on portions of the charge have been properly modified. To avoid this objectional feature, we have devised a decorticating and degerminating apparatus the characteristic of which is that it consists of a connected series of a plurality of breaking and screening devices arranged in alternating sequence through which the grain to be treated may pass in an uninterrupted and continuous flow, being subjected for a comparatively short time to the action of each breaker and the material passing therefrom to the next screen, so as to separate out from the charge the finished product, leaving only the still insufficiently cracked or broken kernels to be acted on by the next succeeding breaker, and so on until the kernels are all broken and reduced to the proper extent. With this combination of devices is associated means whereby moisture may be added to the material under treatment at the various points in the apparatus where it is likely that the material may need to have additional moisture supplied to it in order to replace the loss due to the heat of attrition and other causes during the progress of the material through the apparatus. The breaking and screening devices for this purpose may be of any approved structure, and we do not desire to be understood as limiting ourselves in this regard. In the accompanying drawings, however, we have shown an apparatus to effectuate our invention which embodies the structural details which we, on the whole, prefer.

In the drawings, to which we shall now refer for a better understanding of our invention, Figure 1 is a sectional plan of the apparatus, omitting the humidifier or moistening device. Fig. 2 is a front elevation of the same with portions broken away and in section to expose the internal construction of the screening and breaking devices. Fig. 3 is a left side elevation of the machine, and Fig. 4 is a right side elevation of the same.

In the apparatus shown in the drawings there are three screening devices and three breaking devices arranged in pairs consisting each of a screening device and a breaking device, the pairs being placed one above the other and supported in that position in a suitable framework X.

Like letters of reference on the three pairs of screening and breaking devices indicate like parts.

Each screening device consists in the present instance of a spirally fluted or ribbed feed-cylinder B, fixed on a shaft A, which revolves in suitable bearings in frame X, said cylinder B being surrounded by a fixed or stationary metallic screen C, which in turn is surrounded by a stationary imperforate jacket D, from which leads a spout $d$, through which is carried off the material which sifts through the screen into the jacket. Each screening device at one end opens into the eye of a breaking device, into which the grain is fed by the spirally fluted or ribbed feed-cylinder B, in addition to which function the cylinder also acts as it carries the grain along to scour it against the screen C.

Each breaking device consists of a fixed annular disk E and a rotating disk F, fixed on and revolving with the shaft A. Each of these plates is provided with concentric rows of teats $e f$ of conical or other suitable form, the rows on the two disks being so located with reference to each other that the rows of teats on the one disk F will enter and move in the intervals between the rows of teats $e$ on the other disk E. The two breaking-disks are surrounded by a suitable casing G, from the bottom of which leads a spout $g'$ into the screening device next below. The breaking devices are at alternately opposite sides of the frame, so that the breaking device above will discharge directly into that end of the screening device next below which is farthest from the breaking device associated with the latter.

In order to adjust the two breaking-disks F E of each breaking device so as to set them at any desired distance apart, the shaft A, to which the breaking-disk F is attached, is made capable of slight longitudinal movement in its bearings, and is thus actuated to move by means of an adjusting-lever H, pivoted at $h$ to the frame X, forked at $h'$ so as to straddle a grooved collar $h^2$, rigidly mounted on shaft A, provided with pins $h^3$ to enter the annular groove in said collar, and finally having a hand-wheel $h^4$, controlling a set-screw moving in a slot in a bracket $h^5$. By loosening the set-screw the lever H will be free and can be moved to adjust the shaft A lengthwise, after which the set-screw can be tightened to secure the parts in adjusted position. The two disks should be so adjusted and set at such distance apart that the kernels of corn entering between their opposed faces will by the action of the projections or teats $e f$ thereon be split or broken in contradistinction to being ground or comminuted. This adjustment in all the breakers is practically the same, the object being to produce bits or fragments of, as far as possible, uniform size and no smaller than is requisite to insure the breaking away and disassociation of the germs from the starchy pieces.

We prefer to make the spirally fluted or ribbed feed-cylinder B in annular sections, as indicated by the lines $b$, so that when any part becomes worn or damaged it can be replaced instead of having to put in an entirely new cylinder.

In order to supply additional moisture to the material at each breakage, we provide as a convenient means for this purpose a steam-supply pipe S, formed as a U-shaped stand-pipe, connected at the bottom through a pipe $s$ and valve $s'$ with a trap T and provided with valve-controlled branch pipes S' S² S³, which communicate, respectively, with the first, second, and third breakers, entering for this purpose through the stationary disk E of the breaker. If steam only is required for the grain, the water of condensation is drawn off through valve $s'$, pipe $s$, and trap T; but if steam and water are required then valve $s'$ is closed. The moisture or steam is admitted through the stationary breaking-disks E, so as to directly meet the material, which in this way can be maintained in its original properly moist condition throughout the entire process, thus materially preventing the production of meal during the successive breaking operations.

The shafts A are driven by means of suitable pulleys and belting, the direction of revolution of the shaft of the intermediate breaking and screening device being, of course, opposite to that of the other two shafts. The pulleys are shown at P, and the course of the belting by which they are actuated is indicated by dotted lines in Fig. 4.

The operation of the machine is as follows: The corn after having been washed and steeped and brought to proper condition enters the machine through the spout $g$. It is fed to the first breaker by the first fluted or ribbed cylinder B, and in its course to this breaker it is by the conjoint action of the cylinder B and the screen C freed from adhering dirt and the fluffy ends of the grain, which pass through the perforations in the screen and are caught in the jacket D, from which they are discharged through the top spout $d$. The corn passes through continuously and uninterruptedly between the splitting or breaking disks of the first breaker and thence down through the top spout $g'$ into the second screening device, which feeds it into the second breaking device, whence it passes uninterruptedly down through the second spout $g'$ into the third or bottom screening device, by which it is fed to the third breaker, and thence it passes out through the bottom spout $g'$, from which it passes to a suitable screening or separating device. The screen C of the second screening device is provided with perforations or round openings of a size sufficiently large to allow germs and small bits or pieces of the size desired for the finished material to pass through it, and the charge by the action of the second screen and its fluted or ribbed cylinder is freed of all such particles by the time it enters the second breaker, which latter therefore acts only on that portion of the grain which has not been sufficiently broken up. The screen C of the third screening device has slightly-larger perforations than the second screen, and by it, in connection with its ribbed or fluted cylinder, the charge is freed from germs, small particles of grain, &c., resulting from the second breaking operation before it reaches the third or finishing breaker. The material which passes out through the perforations in the second screen is caught in the intermediate jacket D and is discharged through the intermediate spout $d$. The material which passes out through the perforations in the bottom screen is caught in the bottom jacket D and is discharged through the bottom spout $d$. During this operation steam or moisture is supplied in proper quantity to the grain as it passes through the several breakers by a proper manipulation and adjustment of the valves of the branch pipes $S'$ $S^2$ $S^3$. Some meal of course unavoidably results from each breaking operation; but the percentage is considerably less than heretofore has been the case. By the old method also a considerable percentage of the germ necessarily was comminuted, and all the offal—good, bad, and indifferent, including the comminuted germ—was discharged together, rendering it impossible to improve its quality by further separation. In our machine, however, and by our mode of procedure, which avoids the comminution of the germ and provides for the removal of the pieces of germ practically immediately after their disassociation from the starch-bearing pieces, each successive breaking and screening leaves the portion of the charge which still remains to be treated purer and more free from germs and fiber, and consequently the meal from each successive operation is whiter and purer, so much so, indeed, that the meal which results from the second and third breakings may be used for other purposes than feed for animals. The starch-bearing material which is screened out by the second and third screening devices is subsequently separated from the meal and particles of germ that may be intermixed with it by usual or suitable processes and instrumentalities.

Having described our invention and the best way now known to us of carrying the same into effect, we desire it to be understood that we do not limit ourselves strictly to the structural details herein set forth, since manifestly the same can be considerably varied without departure from the invention; but

What we claim herein as new, and desire to secure by Letters Patent, is as follows:

1. An apparatus for the degermination and decortication of maize consisting of a plurality of breaking devices, through and out from which the grain will pass in uninterrupted flow, constructed and arranged to break or split the kernels into fragments of a size to insure the breaking away of the germ from the starch-bearing portions in contradistinction to grinding or comminuting the grain, and a plurality of screening devices arranged in alternating sequence with, and connected to, the breaking devices as described and adapted to separate out from the grain under treatment, such fragments of grain as are broken to the proper size, along with corresponding bits of germ and other bodies of the same or less size produced in the last preceding breaker before the grain enters the next succeeding breaker, substantially as and for the purposes hereinbefore set forth.

2. An apparatus for the degermination and decortication of maize, consisting of a connected series of breaking and screening devices arranged in alternating sequence, together with means for supplying moisture to the material under treatment at a number of points during its passage through the apparatus as and for the purposes hereinbefore set forth.

3. An apparatus for the degermination and decortication of maize consisting of a series of breaking and screening devices arranged in superposed pairs consisting each of a screening device and a breaking device having its inlet connected with one end of its own screening device and its outlet or discharge spout connected with the opposite end of the screening device of the pair next below, substantially as and for the purposes hereinbefore set forth.

4. An apparatus for the degermination and decortication of maize consisting of a connected series of breaking and screening devices arranged in alternating sequence, together with valve-controlled pipes which are connected with a suitable source of steam or water supply, and open into the interior of the breaking devices so as to supply moisture to the material there under treatment, substantially as and for the purposes hereinbefore set forth.

In testimony whereof we have hereunto set our hands to the foregoing specification.

THOMAS T. GAFF.
JOSEPH F. GENT.

Witnesses to signature of Thomas T. Gaff:
GORDON SHILLITO,
CHARLES F. PARKER.

Witnesses to signature of Joseph F. Gent:
ALBERT W. HAZELRIGG,
KARL T. GENT.